United States Patent [19]
Griffin et al.

[11] Patent Number: 5,598,750
[45] Date of Patent: Feb. 4, 1997

[54] ELEMENTS FACED WITH SUPERHARD MATERIAL

[75] Inventors: Nigel D. Griffin, Whitminster; T. Alex Newton, Clifton, both of England

[73] Assignee: Camco Drilling Group Limited, Stonehouse, England

[21] Appl. No.: 337,241

[22] Filed: Nov. 9, 1994

[30] Foreign Application Priority Data

Nov. 10, 1993 [GB] United Kingdom ............... 9323207
Jun. 18, 1994 [GB] United Kingdom ............... 9412248

[51] Int. Cl.⁶ ..................... E21B 10/46; E21B 10/56
[52] U.S. Cl. ............... 76/108.2; 76/DIG. 6; 76/DIG. 12; 175/428
[58] Field of Search ................. 76/108.2, DIG. 6, 76/DIG. 12; 175/428–434, 420.1, 420.2

[56] References Cited

U.S. PATENT DOCUMENTS

| | | |
|---|---|---|
| 4,109,737 | 8/1978 | Bovenkerk . |
| 4,629,373 | 12/1986 | Hall ................. 76/DIG. 12 |
| 4,784,023 | 11/1988 | Dennis . |
| 5,011,515 | 4/1991 | Frushour . |
| 5,120,327 | 6/1992 | Dennis . |
| 5,351,772 | 10/1994 | Smith ................. 175/428 |

FOREIGN PATENT DOCUMENTS

| | | |
|---|---|---|
| 0462955 | 12/1991 | European Pat. Off. . |
| 0462091 | 12/1991 | European Pat. Off. . |
| 0601840 | 6/1994 | European Pat. Off. . |
| 0604211 | 6/1994 | European Pat. Off. . |
| 2273306 | 6/1994 | United Kingdom . |
| 2275068 | 8/1994 | United Kingdom . |

*Primary Examiner*—Douglas D. Watts

[57] ABSTRACT

A preform element, such as a cutting element for a drag-type drill bit, includes a facing table of superhard material having a front cutting face, a peripheral surface, and a rear surface bonded to a substrate which is less hard than the superhard material. The rear surface of the facing table is integrally formed with a plurality of protuberances, such as ribs or studs, which project into the substrate. The depth to which the protuberances project into the substrate varies in irregular manner across the facing table, so as to inhibit the propagation of cracks across the substrate to the rear of the facing table.

15 Claims, 3 Drawing Sheets

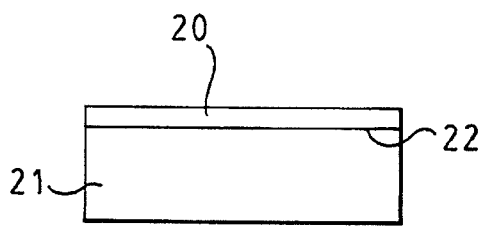
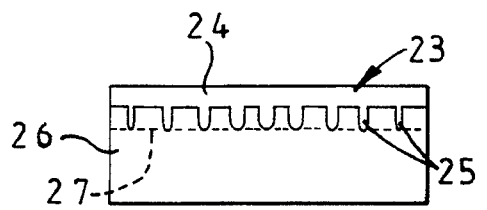
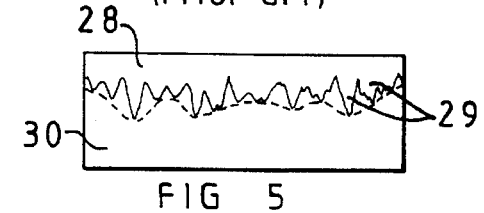
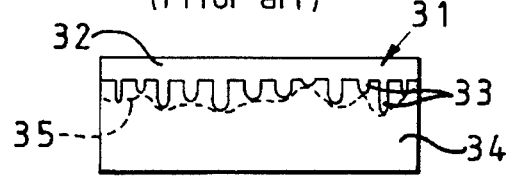
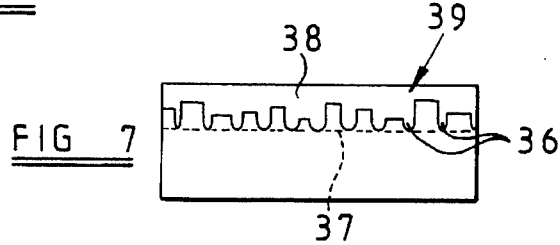
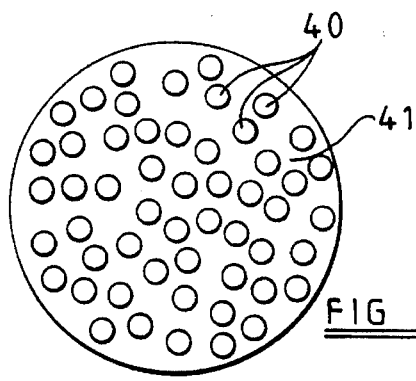
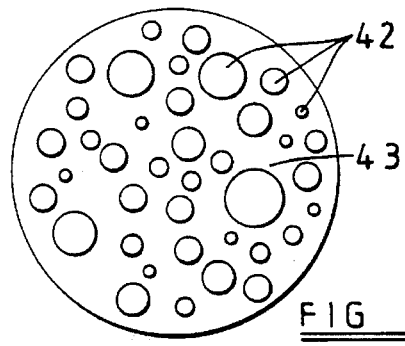
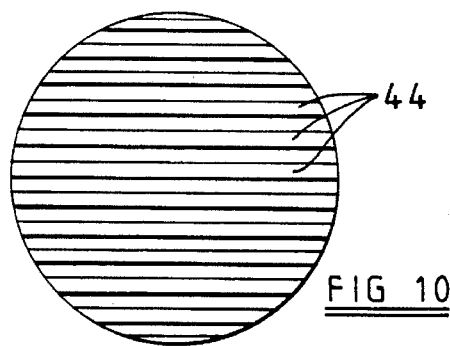
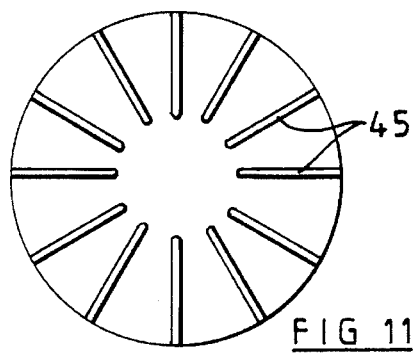

ELEMENTS FACED WITH SUPERHARD MATERIAL

BACKGROUND OF THE INVENTION

The invention relates to elements faced with superhard material, and particularly to preform elements comprising a facing table of superhard material having a front face, a peripheral surface, and a rear surface bonded to a substrate of material which is less hard than the superhard material.

Preform elements of this kind are often used as cutting elements on rotary drag-type drill bits, and the present invention will be particularly described in relation to such use. However, the invention is not restricted to cutting elements for this particular use, and may relate to preform elements for other purposes. For example, elements faced with superhard material, of the kind referred to, may also be employed in workpiece-shaping tools, high pressure nozzles, wire-drawing dies, bearings and other parts subject to sliding wear, as well as elements subject to percussive loads as may be the case in tappets, cams, cam followers, and similar devices in which a surface of high wear resistance is required.

Preform elements used as cutting elements in rotary drill bits usually have a facing table of polycrystalline diamond, although other superhard materials are available, such as cubic boron nitride. The substrate of less hard material is often formed from cemented tungsten carbide, and the facing table and substrate are bonded together during formation of the element in a high pressure, high temperature forming press. This forming process is well known and will not be described in detail.

Each preform cutting element may be mounted on a carrier in the form of a generally cylindrical stud or post received in a socket in the body of the drill bit. The carrier is often formed from cemented tungsten carbide, the surface of the substrate being brazed to a surface on the carrier, for example by a process known as "LS bonding". Alternatively, the substrate itself may be of sufficient thickness as to provide, in effect, a cylindrical stud which is sufficiently long to be directly received in a socket in the bit body, without being brazed to a carrier. The bit body itself may be machined from metal, usually steel, or may be moulded using a powder metallurgy process.

Such cutting elements are subjected to extremes of temperature during formation and mounting on the bit body, and are also subjected to high temperatures and heavy loads when the drill is in use down a borehole. It is found that as a result of such conditions spalling and delamination of the superhard facing table can occur, that is to say the separation and loss of the diamond or other superhard material over the cutting surface of the table.

This may also occur in preform elements used for other purposes, and particularly where the elements are subjected to repetitive percussive loads, as in tappets and cam mechanisms.

Commonly, in preform elements of the above type the interface between the superhard table and the substrate has usually been flat and planar. However, particularly in cutting elements for drill bits, attempts have been made to improve the bond between the superhard facing table and the substrate by configuring the rear face of the facing table so as to provide a degree of mechanical interlocking between the facing table and substrate.

One such arrangement is shown in U.S. Pat. No. 512,327 where the rear surface of the facing table is integrally formed with a plurality of identical spaced apart parallel ribs of constant depth. The facing table also includes a peripheral ring of greater thickness, the extremities of the parallel ribs intersecting the surrounding ring. U.S. Pat. No. 4,784,023 illustrates a similar arrangement but without the peripheral ring.

In most prior art arrangements the ribs generally all project into the substrate to substantially the same depth. In cases where the ribs project into the substrate for different depths, the ribs of different depths are arranged in a regular pattern which is commonly symmetrical about some axis of the preform element.

Thus, in the prior art arrangements the rear extremities of the ribs, as they project into the substrate, lie on an imaginary surface which is substantially smooth and continuous. In the case where the ribs are of constant depth, such imaginary surface will be a flat plane.

As a result, the provision of such ribs may do little or nothing to inhibit the propagation of cracks through the substrate. Thus, a crack may be initiated at the rearward extremity of a single rib, and if the ribs are of the same depth, or if their extremities otherwise lie on a smooth plane, there is nothing to prevent the crack from propagating completely across the rearward extremities of all the ribs. The present invention provides an improved design of preform element where such crack propagation may be more effectively inhibited.

SUMMARY OF THE INVENTION

According to the invention there is provided a preform element including a facing table of superhard material having a front cutting face, a peripheral surface, and a rear surface bonded to a substrate which is less hard than the superhard material, the rear surface of the facing table being integrally formed with a plurality of protuberances which project into the substrate, the depth to which at least certain of said protuberances project into the substrate varying in irregular manner across the facing table.

Since the depth of the protuberances varies in an irregular manner across the facing table, a crack initiated at the rearward extremity of one protuberance is likely, as it is propagated, to meet another protuberance at a location part way along its depth, so that the protuberance intercepts the developing crack and inhibits its further propagation.

The depths of the protuberances may vary essentially randomly across the facing table.

Preferably an imaginary surface extending across the substrate and connecting the rearward extremities of the protuberances is discontinuous. However, the invention includes within its scope arrangements in which said imaginary surface is smoothly continuous, in which case the variation in depth of the protuberances is provided by variation in the thickness of the facing table from which the protuberances project.

Preferably, however, the facing table comprises a front portion having a substantially planar rear surface, said protuberances extending from said rear surface and into the substrate to different depths.

The protuberances may be spaced apart across the rear surface of the facing table or may be disposed in close side-by-side relationship, in which case the protuberances reduce in width, so as to provide clearances between adjacent protuberances, as they extend into the substrate.

The protuberances may be disposed in a regular pattern across the facing table, or may be arranged in an irregular manner.

The protuberances may be of generally stud-like form or may be generally in the form of elongate ribs, or may comprise a mixture thereof.

Where the protuberances are of stud-like form they may be of substantially circular cross-section, or of other regular cross-section, or of irregular cross-sectional shape.

In the case where the protuberances are in the form of fibs, the ribs may be substantially straight, curved or of irregular shape. The depth and/or width of each rib may vary along the length thereof.

BRIEF DESCRIPTION OF THE DRAWINGS

FIGS. 5–7 are diagrammatic cross-sections of preform cutting elements in accordance with the present invention, FIGS. 8–13 are underside plan views of the superhard facing table of a preform cutting element in accordance with the invention, the substrate, which would normally be bonded to the underside of the facing table, being removed to show the configuration of the protuberances on the undersurface of the facing table.

DETAILED DESCRIPTION OF THE PREFERRED EMBODIMENTS

Figure 1:
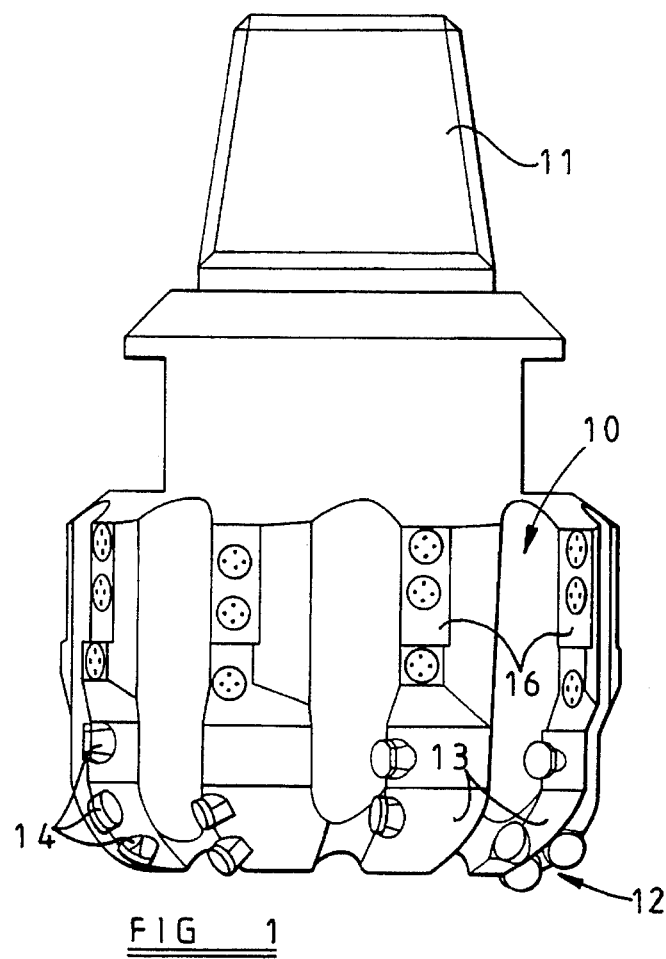
FIG. 1 is a side elevation of a typical drag-type drill bit in which preform cutting elements according to the present invention may be used.
Figure 2:
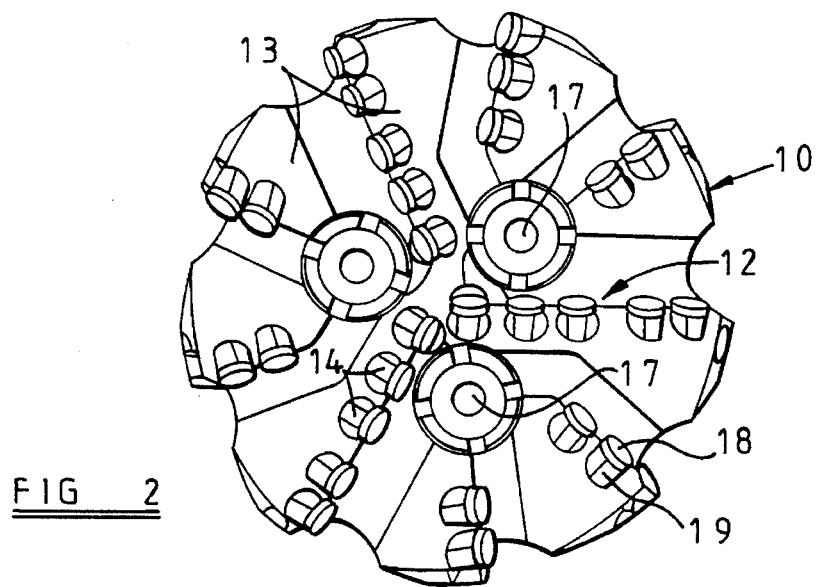
FIG. 2 is an end elevation of the drill bit shown in FIG. 1, FIGS. 3 and 4 are cross-sections of prior art preform cutting elements.

FIGS. 1 and 2 show a typical full bore drag-bit of a kind to which cutting elements of the present invention are applicable. The bit body 10 is machined from steel and has a shank formed with an externally threaded tapered pin 11 at one end for connection to the drill string. The operative end face 12 of the bit body is formed with a number of blades 13 radiating from the central area of the bit, and the blades carry cutter assemblies 14 spaced apart along the length thereof. The bit has a gauge section including kickers 16 which contact the walls of the borehole to stabilise the bit in the borehole. A central passage (not shown) in the bit and shank delivers drilling fluid through nozzles 17 in the end face 12 in known manner.

Each cutter assembly 14 comprises a preform cutting element 18 mounted on a carrier 19 in the form of a post which is located in a socket in the bit body. Each preform cutting element is in the form of a circular tablet comprising a facing table of superhard material, usually polycrystalline diamond, bonded to a substrate which is normally of cemented tungsten carbide. The rear surface of the substrate is bonded, for example by LBS bonding, to a suitably orientated surface on the post 19.

A typical prior art preform cutting element is shown in section in FIG. 3. The cutting element is in the form of a circular tablet and comprises a polycrystalline diamond front facing table 20 bonded to a cemented tungsten carbide substrate 21. Both the facing table 20 and substrate 21 are of constant thickness and the interface 22 between them is flat. As is well known, the facing table and substrate are bonded together during formation of the element in a high pressure, high temperature forming press.

FIG. 4 shows another prior art cutting element of a kind designed to improve the bond between the facing table and substrate and to reduce the tendency for delamination to occur.

In this case the facing table 23 comprises a flat front layer 24 of constant thickness which provides the front cutting face of the facing table. Integrally formed with the front layer 24 are a plurality of parallel spaced ribs 25 which project rearwardly from the front layer 24 and into the substrate 26. The ribs 25 are equally spaced apart and project into the substrate 26 to a uniform depth so that the rearward extremities of the ribs lie on an imaginary plane 28 which is flat.

Although the provision of the ribs 25 improves the bond between the facing table and substrate, it may not effectively inhibit the propagation of cracks across the substrate. Thus, a crack in the substrate is likely to be initiated at the rearward extremity of one of the ribs 25, probably a rib near the periphery of the cutting element. If this should occur the presence of the other ribs will not prevent propagation of the crack, since it can readily propagate across the whole area of the substrate 26, following the line of the flat imaginary plane 27, leading to eventual separation of the ribbed facing table 23 from the substrate 26.

FIG. 5 shows one form of preform element according to the present invention. In this case the rear face of the facing table 28 is formed with irregular protuberances 29. The protuberances 29 project to depths into the substrate 30 which vary irregularly, and in random manner, across the area of the facing table. As a result, the imaginary plane 31 which extends across the substrate 30 and connects the rearward extremities of the protuberances 29 is discontinuous and does not provide a smooth and continuous path along which a crack may be propagated. Consequently, a crack initiated in the substrate 30 at a depth less than the deepest protuberance will, as it propagates across the substrate, eventually meet a polycrystalline diamond protuberance, thus inhibiting further propagation of the crack.

The protuberances 29 may be irregular stud-like protuberances so that all cross-sections of the preform element will be somewhat similar to that shown in FIG. 5. Alternatively, however, the protuberances 29 may be elongate ribs which are generally parallel but which are of the irregular cross-section shown.

FIG. 6 shows a further arrangement in accordance with the invention. In this case the facing table 31 of the preform element comprises a flat front layer 32 of constant thickness from the rear surface of which protuberances 33 project into the substrate 34.

Again, the protuberances 33 project into the substrate 34 to depths which vary irregularly across the area of the element so that the imaginary plane 35 connecting the rearward extremities of the protuberances is discontinuous.

In the arrangement shown the protuberances 33 are stud-like projections of substantially equal circular cross-section. As will be described, however, they might also be of difference cross-sectional shapes and sizes and may be irregularly spaced across the area of the element.

Although it is preferable that the rearward extremities of the protuberances lie on an imaginary plane which is discontinuous, this is not essential to the invention and an alternative arrangement is shown in FIG. 7.

In the arrangement of FIG. 7 the protuberances 36 are of difference depths, the depth varying irregularly across the element, but their rearward extremities lie on an imaginary plane 37 which is flat. The difference in depth of the protuberances is provided by, in effect, varying the thickness of the facing layer 38 of the front table 39 of the cutting element. Again, the protuberances 36 are of constant circular cross-section but, as in the arrangement of FIG. 6, they might also be of different cross-sectional sizes and shapes.

In the arrangements of FIGS. 6 and 7 the protuberances 33 and 36 are separate stud-like projections extending integrally from the rear surface of the facing layer. It will be appreciated, however, that the protuberances might also be in the form of elongate ribs in which case the sectional views would be similar to those shown in FIGS. 6 and 7. Again, the cross-sectional shapes of the ribs may vary across the element, and also each rib may vary in depth along its length provided that, in accordance with the invention, different ribs are of different depths in an irregular arrangement across the element.

Provided that the depths of the protuberances vary in irregular fashion across the element, in accordance with the invention, the configuration of the protuberances, as seen in plan view, may be of any suitable form.

Thus, FIG. 8 shows an arrangement in which the protuberances 40 projecting from the rear surface of the front layer 41 of the facing table are of circular cross-section and constant diameter but are disposed randomly across the surface of the facing table.

FIG. 9 shows a similar arrangement, but in this case the protuberances 42 vary in diameter as they are spaced randomly across the surface of the facing layer 43. Instead of being of circular cross-section the protuberances may be of any other regular or irregular cross-sectional shape and the cross-sectional shape may vary from one protuberance to another.

FIGS. 10–13 illustrate by way of example various possible arrangements in the case where the protuberances are in the form of elongate ribs. In FIG. 10 the ribs 44 are parallel and extend from side-to-side of the preform element in similar fashion to the prior art arrangement of FIG. 4. In accordance with the present invention, however, the depths of the different ribs are varied in irregular manner across the element. Each rib may also vary in depth along its own length. For example, there may be advantage in increasing the depth of each rib as it approaches the periphery of the element.

In the arrangement of FIG. 11 the ribs 45 extend substantially radially. In this case the depths of the different ribs vary in irregular manner around the circumference of the element and, as in the previous arrangement, each rib may also vary in depth along its own length, preferably being deeper nearer the periphery of the element.

Figure 12:
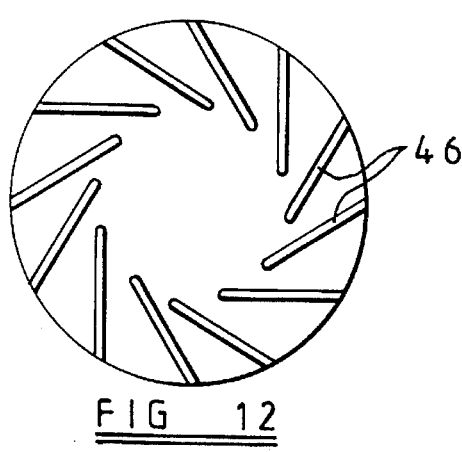
Figure 13:
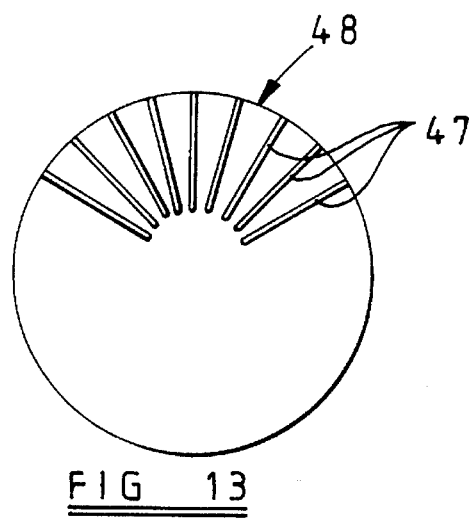

FIG. 12 shows a somewhat similar arrangement to FIG. 11 except that the ribs 46 are non-radially arranged.

Where the preform element is a cutting element, only part of the periphery of which provides a cutting edge, the ribs or other protuberances need not necessarily extend over the whole of the element but may be confined to a region towards the cutting edge. FIG. 13 shows one such arrangement where a number of radially extending ribs 47 are disposed in the region adjacent the cutting edge 48 of the element. In accordance with the invention the different ribs are of different depths in irregular manner.

In any of the arrangements described in relation to FIGS. 10–13, the ribs may be all of the same width or may vary in width across the element. Each rib may also vary in width along the length thereof. Although straight ribs are shown, the ribs might also be curved, s-shaped, zig-zag shaped or of any other configuration.

The arrangements described are only examples of the very many different plan-view configurations of protuberances which may be employed in accordance with the present invention.

In the arrangements of FIGS. 5 and 6, the protuberances 29 and 33 may be regarded as being formed on a front layer 28 or 32 which is basically flat. Looked at another way, the protuberances may be regarded as variations in depth above and below an average surface which is flat and parallel to the front face of the cutting element.

However, the invention includes within its scope arrangements in which the protuberances are irregular variations in a surface which is not flat but has another configuration. Two such arrangements are shown in FIGS. 14 and 15 respectively.

Figure 14:
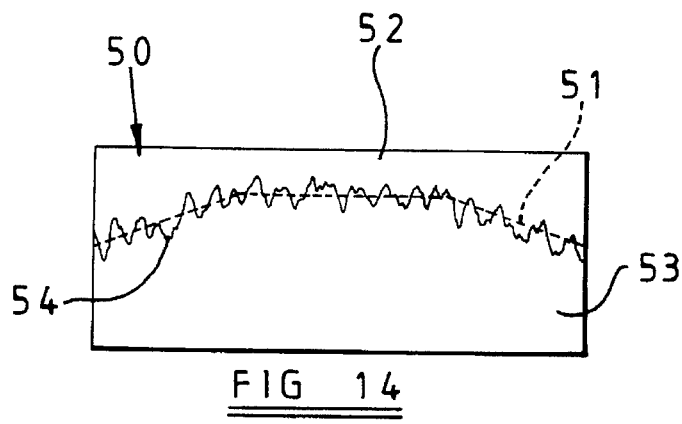
FIGS. 14 and 15 are diagrammatic cross-sections of further forms of preform cutting element in accordance with the present invention.

In the arrangement of FIG. 14, the basic underlying shape of the front layer 50 is shown by the dotted line indicated at 51 and comprises a central circular flat portion 52 surrounded by an annular portion which increases in depth towards the outer periphery of the cutting element to provide an interface between the facing layer 50 and substrate 53 which is basically frusto-conical. The protuberances 54 then comprise irregular depth variations overlaid on this underlying average shape.

Figure 15:
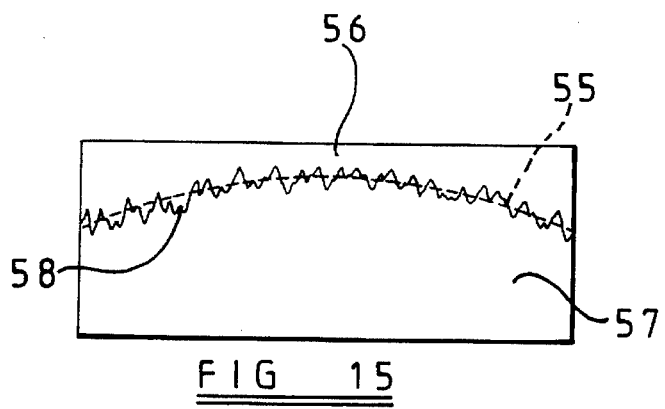

FIG. 15 shows an alternative arrangement where the basic interface 55 between the facing layer 56 and the substrate 57 is part-spherical, the irregular protuberances 58 again representing variations in depth above and below this basic part-spherical shape.

It will be appreciated that the irregular protuberances may be superimposed on any other underlying shape of interface.

It is to be understood that references in this specification to "protuberances" are intended to refer to projections which are larger than the slight irregularities which may occur as a result of conventional manufacturing or finishing processes. Thus, in the prior art arrangement shown in FIG. 3, the interface 22 between the front layer 20 and the substrate 21 may embody slight overall irregularities notwithstanding that it is nominally flat. For example, in order to form the cutting element in a high pressure, high temperature press, the substrate 21 may comprise a solid disc of tungsten carbide to which a layer of diamond particles is applied and subsequently bonded by the pressing operation. The shape of the interface 22 will thus depend on the configuration of the upper face of the solid substrate 21 to which the diamond particles are applied, and this surface may embody slight irregularities as a result of machining or other forming operations. Similarly, if both layers are in particulate form, in the finished element individual diamond particles of the diamond layer 20 may project into the substrate 21, and vice versa. Such small scale irregularities are not to be regarded as "protuberances" within the terms of the present invention as hereinbefore defined.

We claim:

1. A preform composite compact element including a facing table of superhard material having a front cutting face, a peripheral surface, and a rear surface bonded to a substrate which is less hard than the superhard material, the facing table and substrate having been bonded together during forming of the element in a high pressure, high temperature forming press, the rear surface of the facing table being integrally formed with a plurality of protuberances which project into the substrate, the depth to which at least certain of said protuberances project into the substrate varying in irregular manner across the facing table, and there being an imaginary surface extending across the substrate and connecting the rearward extremities of the protuberances, which surface is non-planar and discontinuous.

2. A preform element according to claim 1, wherein the facing table comprises a front portion having a substantially planar rear surface, said protuberances extending from said rear surface and into the substrate to different depths.

3. A preform element according to claim 2, wherein the protuberances are spaced apart across the rear surface of the facing table.

4. A preform element according to claim 2, wherein the protuberances are disposed in close side-by-side relationship and reduce in width, so as to provide clearances between adjacent protuberances, as they extend into the substrate.

5. A preform element according to claim 2, wherein the protuberances are disposed in a regular pattern across the facing table.

6. A preform element according to claim 2, wherein the protuberances are arranged in an irregular manner.

7. A preform element according to claim 2, wherein the protuberances are of generally stud-like form.

8. A preform element according to claim 2, wherein the protuberances are generally in the form of elongate ribs.

9. A preform element according to claim 7, wherein the protuberances are of substantially circular cross-section.

10. A preform element according to claim 7, wherein the protuberances are of irregular cross-sectional shape.

11. A preform element according to claim 8, wherein the ribs are substantially straight.

12. A preform element according to claim 8, wherein the ribs are curved.

13. A preform element according to claim 8, wherein the ribs are of irregular shape.

14. A preform element according to claim 8, wherein the depth of each rib varies along the length thereof.

15. A preform element according to claim 8, wherein the width of each rib varies along the length thereof.

* * * * *